2,953,431
PURIFICATION OF UF$_6$

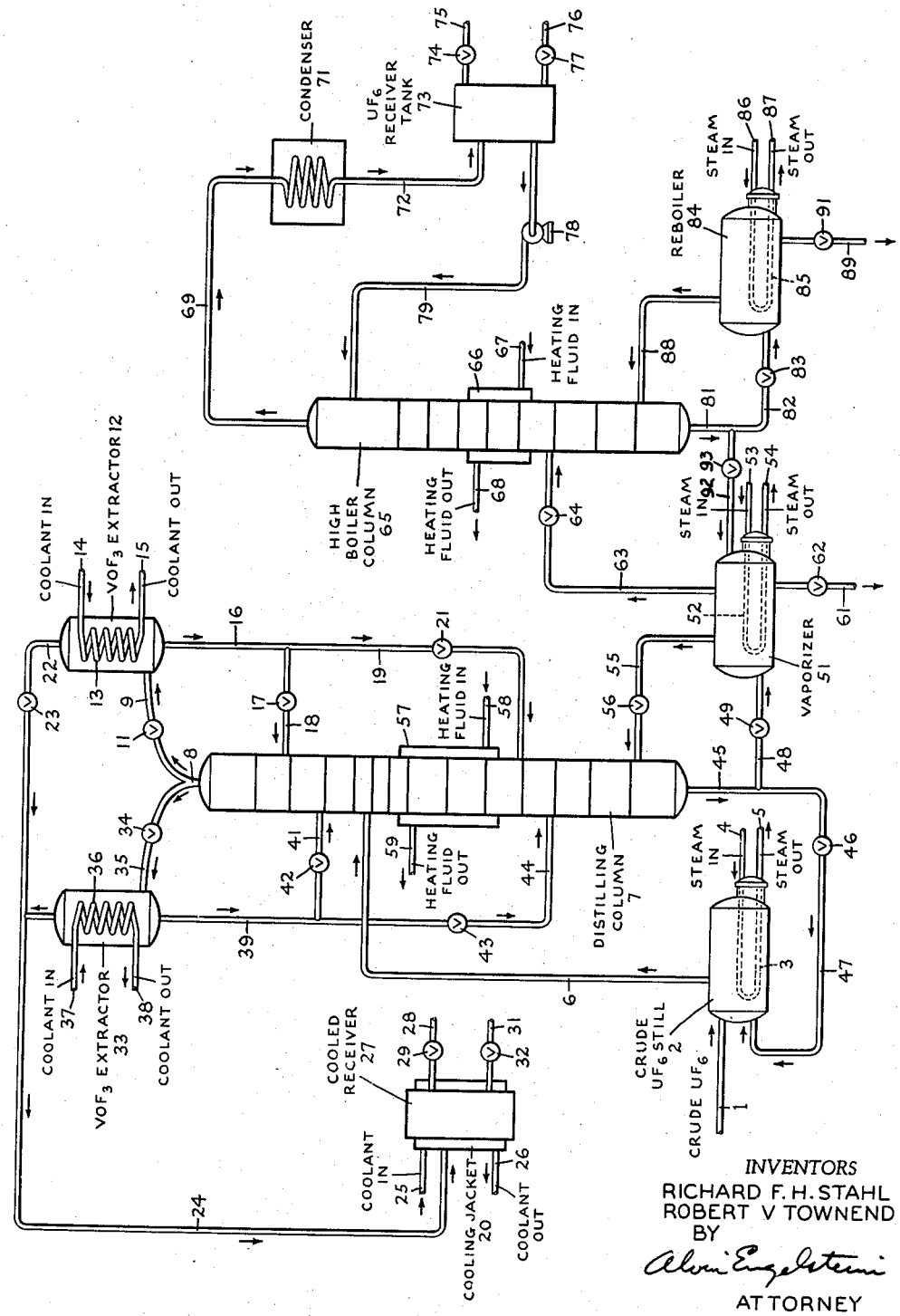

Robert V. Townend, Morris Township, Morris County, and Richard F. H. Stahl, Madison, N.J., assignors to Allied Chemical Corporation, a corporation of New York Filed Apr. 10, 1958, Ser. No. 727,639

6 Claims. (Cl. 23—14.5)

This invention relates to purifying uranium hexafluoride and more particularly refers to a new and improved method of removing impurities from crude uranium hexafluoride.

Crude uranium hexafluoride as prepared directly from uranium concentrate by gaseous reduction to uranium dioxide, hydrofluorination to uranium tetrafluoride, and fluorination to give uranium hexafluoride, contains a number of impurities. These may consist of fluorides which are volatile at the fluorination temperature together with dust or non-volatile impurities carried over. The fluorination of UF$_4$ with fluorine to give UF$_6$ is not appreciable at a temperature below about 250° C. The reaction can be carried out at a temperature of 350° to 400° C. or above.

Crude uranium hexafluoride thus produced contains a mixture of impurities consisting of highly volatile constituents having a boiling point well below the point at which UF$_6$ has a vapor pressure of one atmosphere (56.4° C.), constituents of intermediate volatility having a boiling point close to the boiling point of UF$_6$ and relatively non-volatile constituents having a boiling point well above the boiling point of UF$_6$. For information the volatility of various fluorides is listed below:

High volatility:       Boiling point
- NF$_3$ — −129° C.
- CF$_4$ — −128° C.
- OF$_2$ — −145° C.
- BF$_3$ — −101° C.
- PF$_5$ — −85° C.
- SiF$_4$ — −90° C. (s. 1230 mm.)
- SF$_6$ — −64° C. (s.)

Intermediate volatility:    Boiling point
- MoF$_6$ — 35° C.
- UF$_6$ — 56.4° C. (s.)
- VF$_5$ — 48.3±1° C.

Non-volatile:           Melting point, ° C.
- PbF$_4$ — 600
- KF — 880
- PbF$_2$ — 885
- CuF$_2$ — 950
- NaF — 992
- AlF$_3$ — 1040
- CaF$_2$ — 1360
- MgF$_2$ — 1396
- CrF$_2$ — 1000+
- FeF$_2$ — 1000+
- RaF$_2$ — 1000+

One of the particularly deleterious impurities in the crude uranium hexafluoride is vanadium. Since vanadium pentafluoride, thought to be the only vanadium compound contained in the crude uranium hexafluoride, has a boiling point below the boiling point of uranium hexafluoride, it was assumed that vanadium pentafluoride could be simply removed by distillation. Contrary to expectation, fractional distillation was not effective in separating the vanadium impurity since analysis of the uranium hexafluoride subjected to fractional distillation showed the presence of considerable amounts of vanadium. In further investigation by us we discovered that crude uranium hexafluoride contained some vanadium pentafluoride and also an appreciable amount, sometimes as high as 0.2%, of vanadium oxytrifluoride, VOF$_3$. According to published literature, vanadium oxytrifluoride has a melting point of 300° C. and a boiling point of 480° C. At the time of our initial experiments, it was confidently expected that any vanadium fluoride compounds present would be eliminated as still bottoms or as a high boiling fraction in a fractional distillation operation. Unfortunately, for some unexplained reason, the vanadium oxytrifluoride did not remain as a residue in the still as would be normally expected of such high boiling material and conventional fractional distillation was unsatisfactory to separate vanadium oxytrifluoride from crude uranium hexafluoride.

One object of the present invention is to provide an efficient economical method of removing impurities from crude uranium hexafluoride to produce highly purified uranium hexafluoride suitable for isotope separation or for metal production.

Another object is to provide a method of extracting vanadium oxytrifluoride contained in crude uranium hexafluoride as an impurity.

A further object is to provide a continuous method for purifying crude uranium hexafluoride to remove volatile and non-volatile impurities including particularly vanadium oxytrifluoride.

Other objects and advantages will be apparent from the following description and accompanying drawing.

In accordance with the present invention vanadium oxytrifluoride is extracted from crude uranium hexafluoride containing vanadium oxytrifluoride as an impurity by passing the vapors of crude uranium hexafluoride in contact with a cooled surface maintained at a temperature below the liquefaction point of uranium hexafluoride to effect condensation of the uranium hexafluoride and deposition of solid vanadium oxytrifluoride on the cooled surface, admixing the uranium hexafluoride condensate with crude uranium hexafluoride and repeatedly passing the admixture of crude uranium hexafluoride vapors and uranium hexafluoride condensate vapors in contact with the cooled surface to effect deposition of solid vanadium oxytrifluoride on the cooled surface until the crude uranium hexafluoride is substantially free of vanadium oxytrifluoride.

In one specific embodiment of the present invention, crude uranium hexafluoride containing volatile impurities boiling below the boiling point of uranium hexafluoride, non-volatile constituents boiling above the boiling point of uranium hexafluoride and vanadium oxytrifluoride is continuously fed into a heating zone wherein the crude uranium hexafluoride is heated to generate vapors, passing vapors comprising principally uranium hexafluoride together with small amounts of volatile impurities and vanadium oxytrifluoride through a fractionating zone and in contact with a cooled surface maintained at a temperature below the liquefaction point of uranium hexafluoride to effect condensation of the uranium hexafluoride and deposition of solid vanadium oxytrifluoride on the cooled surface, continuously bleeding non-condensable constituents containing the volatile impurities, said non-condensable constituents generally constituting less than 10% of the crude uranium hexafluoride feed, preferably about 0.5–5% by weight of the crude uranium hexafluoride feed, continuously returning the uranium hexafluoride condensate after contact with the cooled surface to the fractionating zone, continuously withdrawing bottoms substantially free of vanadium oxytrifluoride and volatile impurities from the fractionating zone and subjecting the bottoms to rectification to separate the non-volatile impurities and remove as overhead the uranium hexafluoride substantially free of impurities.

Surprisingly, despite the high boiling point of vanadium oxytrifluoride it was found that some of the vanadium oxytrifluoride in crude uranium hexafluoride passed over as vapor with uranium hexafluoride upon distillation of the crude. Since there was no available data on the behavior of vanadium oxytrifluoride in uranium hexafluoride, tests were conducted to determine the vapor-liquid equilibrium and the solubility of vanadium oxytrifluoride in uranium hexafluoride. These tests showed that the vapor enrichment for $VOF_3$ in system $VOF_3$—$UF_6$ is approximately 3 and that the solubility of $VOF_3$ in $UF_6$ at 70° C. is approximately 0.7%. Thus conventional distillation would be inadequate to separate vanadium oxytrifluoride from crude uranium hexafluoride to produce purified uranium hexafluoride substantially free of vanadium oxytrifluoride because vanadium oxytrifluoride passed over as vapors with uranium hexafluoride vapor and also the solubility of vanadium oxytrifluoride in uranium hexafluoride was greater than the amount of vanadium oxytrifluoride normally contained as an impurity in crude uranium hexafluoride.

In the course of further investigation we discovered that vanadium oxytrifluoride could be extracted and removed as a solid from vapors of uranium hexafluoride containing small amounts of the order of about ½% or less of vanadium oxytrifluoride in vapor form by passing the vapors in contact with a cooled surface maintained at a temperature below the liquefaction point of uranium hexafluoride, and further that all or substantially all of the vanadium oxytrifluoride could be extracted and separated out as a solid by continuously returning the uranium hexafluoride condensate to the mixture of uranium hexafluoride vapor and vanadium oxytrifluoride vapor, and continuously passing such mixture in contact with the cooled surface until substantially all of the vanadium oxytrifluoride is deposited on the cooled surface as a solid. The extraction and deposition of solid vanadium oxytrifluoride from a vapor mixture of uranium hexafluoride and vanadium oxytrifluoride is unexpected and surprising in view of the vapor-liquid equilibrium, solubility and boiling point of vanadium oxytrifluoride and uranium hexafluoride. The behavior of vanadium oxytrifluoride in uranium hexafluoride could not be correlated with Raoult's law.

The accompanying drawing diagrammatically illustrates one method of carrying out the present invention. Referring to the drawing, crude uranium hexafluoride consisting generally of about 99% uranium hexafluoride and about 1% impurities composed of volatile constituents, non-volatile constituents and vanadium oxytrifluoride is introduced, preferably first being preheated through line 1 into crude $UF_6$ still 2 which may be any suitable heating equipment to effect vaporization of crude $UF_6$, preferably a shell still as illustrated in the drawing equipped with a heating coil 3 through which a heating medium such as steam flows entering through line 4 and discharging through line 5. The temperature in still 2 should be sufficiently high to vaporize the crude $UF_6$, the boiling point of $UF_6$ at about 2 atmospheres' pressure being 73.2° C. In practice it is preferred to operate under superatmospheric pressure of the order of 10–150 p.s.i.g. or higher and at the higher pressures a higher temperature will be required to effect vaporization.

Crude $UF_6$ vapors from still 2 flow through line 6 into distilling column 7 which may be any suitable tower equipped with bubble-cap trays or filled with packing such as Berl saddles. From the top of column 7 maintained at a temperature of about 55–80° C. dependent upon the pressure are released vapors composed of uranium hexafluoride, vanadium oxytrifluoride and volatile impurities, passing through lines 8 and 9 and valve 11 into $VOF_3$ extractor 12 containing a cooling surface 13 through which a cooling medium such as water enters through line 14 and discharges through line 15. The temperature of cooling surface 13 is maintained below the liquefaction temperature of uranium hexafluoride, dependent upon the pressure, to effect condensation of uranium hexafluoride and deposition of vanadium oxytrifluoride on the surface of cooling surface 13. The temperature of cooling surface 13 should be sufficiently low to cause solidification and deposition of vanadium oxytrifluoride and liquefaction of uranium hexafluoride, but no substantial solidification of uranium hexafluoride. Ordinarily a temperature about 10–15° C. below the liquefaction point of uranium hexafluoride will be adequate. The solid deposited on cooling surface 13 is in the form of crystals and upon analysis contains about 80% $VOF_3$ and 9% $UF_6$. Generally, the greater portion of the solid will deposit in the upper cool section of the $VOF_3$ extractor.

Liquid uranium hexafluoride condensate resulting from contact of vapors with cooling surface 13 is discharged through line 16, valve 17 and returned via line 18 to column 7. A portion of the liquid condensate may be returned to column 7 through line 19 and valve 21. If desired, particularly in smaller scale operations, vapor line 8 may be of large diameter to permit the downward flow of uranium hexafluoride condensate and function to carry vapors upwardly and return condensate downwardly. In practice we have found that the contact of crude uranium hexafluoride vapors containing vanadium oxytrifluoride vapors only once with the cooling surface will not adequately separate and remove vanadium oxytrifluoride impurity to produce a sufficiently pure uranium hexafluoride, and therefore, it is necessary to repeatedly contact the impure uranium hexafluoride vapors with the cooling surface to incrementally deposit vanadium oxytrifluoride on the cooling surface. The extent of passage of vapor in contact with cooling surface 13 will be dependent upon the quantity of vanadium oxytrifluoride contained in the crude uranium hexafluoride. In general, good operation will be obtained with a volume of vapor per unit of time passing in contact with element 13 at least 3–10 times volume of crude uranium hexafluoride vapors generated in still 2.

The volatile impurities are released from $VOF_3$ extractor 12 through line 22, valve 23 and line 24, into cooled receiver 27 equipped with cooling jacket 20 through which coolant is introduced through line 25 and discharged through line 26. Non-condensable impurities are discharged from receiver 27 through line 28 and valve 29. Liquid impurities are discharged from receiver 27 through line 31 and valve 32. Solids which accumulate in receiver 27 can be easily removed by vaporization by passing a hot fluid through jacket 20. Ordinarily a small bleed constituting 5–10% or less based on the crude $UF_6$ feed will be adequate to remove all or substantially all volatile impurities in the crude uranium hexafluoride.

To permit continuity of operation an alternate $VOF_3$ extractor 33 is provided. If it is desired to clean $VOF_3$ extractor 12, then valves 11, 17 and 21 are closed and the vapors flow from the top of column 7 through line 8, valve 34, line 35 into $VOF_3$ extractor 33 equipped with cooling surface 36 through which water flows entering through line 37 and discharging through line 38. A method of removing solids from $VOF_3$ extractor is to pass a heating fluid such as steam through coil 13 to vaporize the solids which may then be separately recovered. Liquid uranium hexafluoride condensate returns through lines 39, 41 and valve 42 into column 7. A portion of the condensate may be returned through line 44, valve 43 into column 7.

The operation may be conducted in a semi-continuous manner, but preferably in a continuous manner. To initiate the operation a batch of crude uranium hexafluoride is introduced into the system through line 1, heated in still 2 and the vapors passed through line 6 into column 7. Vapors from the top of column 7 are passed through lines 8 and 9 and valve 11 into $VOF_3$ extractor 12 in contact with cooling element 13 to effect deposition of solid vanadium oxytrifluoride thereon and condensation of uranium hexafluoride. Volatile impurities are released from the system through line 22 and valve 23. Liquid uranium hexafluoride condensate is returned to column 7 through ilne 16, valve 17 and line 18. The flow of vapor through line 8 and return of liquid $UF_6$ condensate is continuously maintained until the uranium hexafluoride is substantially free of vanadium oxytrifluoride. To provide heat in distilling column 7, a porton of the bottoms collecting in the bottom of column 7 may be withdrawn through line 45, valve 46 and line 47 to still 2 wherein it is revaporized and returned via line 6 to column 7. Alternatively, the bottoms withdrawn from still 7 through line 45 may be sent via line 48 and valve 49 to vaporizer 51 equipped with heating coil 52 through which steam enters through line 53 and discharges through line 54, and the vapors sent through line 55 and valve 56 to column 7. Additionally to provide temperature control, column 7 may be equipped with a heating jacket 57 into which is introduced a heating fluid such as steam entering through line 58 and discharging through line 59.

In the semi-continuous type operation the uranium hexafluoride substantially free of vanadium oxytrifluoride contained in the system may be withdrawn and subjected to distillation to separate the high boilers, i.e., the nonvolatile constituents remaining in the uranium hexafluoride. In the continuous operation, the preferred method, crude uranium hexafluoride is continuously introduced through line 1 in crude $UF_6$ still 2, vapors are continuously passed through line 6 into distilling column 7, vapors are continuously released from the top of column 7 through line 8 and introduced into $VOF_3$ extractor 12, vanadium oxytrifluoride is continuously deposited on cooling surface 13, volatile impurities are continuously bled from $VOF_3$ extractor through line 22, and uranium hexafluoride from which substantially all of vanadium oxytrifluoride have been removed and free of volatile impurities is continuously withdrawn from the bottom of column 7 through line 45. Before starting the continuous operation it is advisable to operate without continuous feed of crude uranium hexafluoride and without continuous withdrawal of bottoms from column 7 until the initial batch of crude uranium hexafluoride in the system is substantially free of vanadium oxytrifluoride. Thereafter continuous introduction of crude uranium hexafluoride and continuous withdrawal of purified uranium hexafluoride is started, and the rate of feed of crude uranium hexafluoride is regulated so as to maintain a very low concentration of vanadium oxytrifluoride in the bottoms withdrawn from column 7. During the continuous operation heat input to column 7 may be regulated by means of heating jacket 57, return of a portion of the bottoms through lines 45 and 47 to crude $UF_6$ still 2 and return of vapors through line 55 to column 7.

Bottoms from column 7 are introduced through lines 45 and 48 into vaporizer 51 wherein they are converted to vapor by means of heating coil 52. Any unvaporized constituents accumulating in vaporizer 51 may be discharged through line 61 and valve 62. Vapors from vaporizer 51 pass through line 63 and valve 64 into high boiler column 65, a fractionating column, which may be equipped with a heating jacket 66 through which a heating fluid such as steam enters through line 67 and discharges through line 68. Purified uranium hexafluoride is released from the top of column 65 through line 69, condensed in condenser 71 and the condensate passed through line 72 into $UF_6$ receiver tank 73. Pressure on the system may be regulated by means of valve 74 in line 75. Purified liquid uranium hexafluoride collecting in tank 73 may be sent to storage through line 76 and valve 77. A portion of the uranium hexafluoride may be returned from tank 73 by means of pump 78 through line 79 to the top of column 65 to maintain the temperature therein. Bottoms from the bottom of column 65 are discharged through line 81 and sent through line 82 and valve 83 to reboiler 84 equipped with heating coil 85 through which steam enters through line 86 and discharges through line 87. Vapors generated in reboiler 85 are returned via line 88 to column 65. High boilers are discharged from reboiler 84 through line 89, valve 91. If desired, a portion of the bottoms discharging through line 81 may be sent through line 92 and valve 93 to vaporizer 51 and the resultant vapors returned to column 65 via line 63 and valve 64.

The following example illustrates the present invention.

Crude uranium hexafluoride having a composition of 0.8% volatile constituents boiling below uranium hexafluoride, 0.1% vanadium oxytrifluoride and 0.3% high boiling constituents boiling above uranium hexafluoride is continuously fed at the rate of 2400 pounds per hour into a crude $UF_6$ still maintained at a temperature of 244° F. and a pressure of 88 p.s.i.a. Vapors from the crude $UF_6$ still are continuously passed to a column equipped with bubble trays from the top of which the vapors pass to a $VOF_3$ extractor in contact with a cooling surface with a surface area of 450 square feet and through which cooling surface water at a temperature of 160° F. passes in indirect contact with the vapor. On the cooling surface is deposited a solid composed of about 80% vanadium oxytrifluoride. Liquid uranium hexafluoride condensate resulting from contact of the vapors with the cooling surface is returned to the column at the rate of 10,800 pounds per hour. A small bleed containing substantially all of the volatile impurities is released from the $VOF_3$ extractor at the rate of about 100 pounds per hour.

Uranium hexafluoride bottoms substantially free from volatile impurities and vanadium oxytrifluoride, but containing high boilers, is withdrawn from the column at the rate of about 2300 pounds per hour and sent to a vaporizer maintained at a temperature of about 250° F. to effect vaporization of the bottoms. The resulting vapors are passed into a fractionating column equipped with a reboiler section and from the top of the column substantially pure uranium hexafluoride is recovered containing less than 0.01% volatile impurities, less than 0.01% vanadium oxytrifluoride, and less than 0.01% high boilers. The bottoms from the fractionating column, at the rate of about 100 pounds per hour and containing substantially all the high boilers, are discharged from the bottom of the fractionating column. If desired, these bottoms may be revaporized to recover the small amount of uranium hexafluoride admixed with the bottoms.

Although certain preferred embodiments of the invention have been disclosed for purpose of illustration it will be evident that various changes and modifications may be made therein without departing from the scope and spirit of the invention.

We claim:

1. A process for separating vanadium oxytrifluoride from uranium hexafluoride containing vanadium oxytrifluoride as an impurity which comprises passing vapors of the impure uranium hexafluoride in contact with a cooled surface maintained at a temperature below the liquefaction of the uranium hexafluoride to effect condensation of the uranium hexafluoride and deposition of solid vanadium oxytrifluoride on the cooled surface, admixing the uranium hexafluoride condensate with impure uranium hexafluoride and repeatedly passing the admixture of impure uranium hexafluoride vapors and uranium hexafluoride condensate vapors in contact with the cooled surface to effect deposition of solid vanadium oxytrifluoride on the cooled surface until the impure uranium hexafluoride has been substantially reduced in vanadium oxytrifluoride content.

2. A process for purifying crude uranium hexafluoride containing volatile impurities boiling below the boiling point of uranium hexafluoride and vanadium oxytrifluoride which comprises passing vapors of crude uranium hexafluoride in contact with a cooled surface maintained at a temperature below the liquefaction point of uranium hexafluoride to effect condensation of the uranium hexafluoride and deposition of solid vanadium oxytrifluoride on the cooled surface, bleeding non-condensable constituents containing the volatile impurities, mixing the uranium hexafluoride condensate with crude uranium hexafluoride and continuously passing crude uranium hexafluoride vapors and uranium hexafluoride condensate vapors in contact with the cooled surface to effect deposition of solid vanadium oxytrifluoride on the cooled surface and continuously passing the uranium hexafluoride condensate in admixture with crude uranium hexafluoride until the crude uranium hexafluoride is substantially free of vanadium oxytrifluoride and volatile impurities.

3. A process for purifying crude uranium hexafluoride containing volatile impurities boiling below the boiling point of uranium hexafluoride, non-volatile constituents boiling above the boiling point of uranium hexafluoride and vanadium oxytrifluoride which comprises passing vapors of crude uranium hexafluoride in contact with a cooled surface maintained at a temperature below the liquefaction point of uranium hexafluoride to effect condensation of the uranium hexafluoride and deposition of solid vanadium oxytrifluoride on the cooled surface, bleeding non-condensable constituents containing the volatile impurities, returning the uranium hexafluoride condensate in admixture with crude uranium hexafluoride vapors and continuously passing crude uranium hexafluoride vapors in contact with the cooled surface to effect deposition of solid vanadium oxytrifluoride on the cooled surface, continuously returning the uranium hexafluoride condensate until the crude uranium hexafluoride is substantially free of vanadium oxytrifluoride and volatile impurities, and subjecting the uranium hexafluoride substantially free of vanadium oxytrifluoride and volatile impurities to distillation to separate the non-volatile impurities and recover the uranium hexafluoride substantially free of impurities.

4. A process as claimed in claim 3 wherein the bleed of non-condensable constituents containing the volatile impurities constitutes about 0.5–10% by weight of the crude uranium hexafluoride feed.

5. A continuous process for purifying crude uranium hexafluoride containing volatile impurities boiling below the boiling point of uranium hexafluoride, non-volatile constituents boiling above the boiling point of uranium hexafluoride and vanadium oxytrifluoride which comprises continuously passing vapors of crude uranium hexafluoride in contact with a cooled surface maintained at a temperature below the liquefaction point of uranium hexafluoride to effect condensation of uranium hexafluoride and deposition of solid vanadium oxytrifluoride on the cooled surface, continuously bleeding non-condensable constituents containing the volatile impurities, continuously returning the uranium hexafluoride condensate after contact with the cooled surface in admixture with crude uranium hexafluoride vapors, continuously withdrawing uranium hexafluoride substantially free of vanadium oxytrifluoride and volatile impurities and continuously passing said withdrawn uranium hexafluoride to a distilling zone to separate the non-volatile impurities and recover uranium hexafluoride substantially free of impurities.

6. A continuous process for purifying crude uranium hexafluoride containing volatile impurities boiling below the boiling point of uranium hexafluoride, non-volatile constituents boiling above the boiling point of uranium hexafluoride and vanadium oxytrifluoride which comprises continuously feeding crude uranium hexafluoride into a heating zone wherein the crude uranium hexafluoride is heated, continuously passing vapors from the heating zone into a distilling zone, continuously passing vapors comprising principally uranium hexafluoride together with small amounts of volatile impurities and vanadium oxytrifluoride from the distilling zone in contact with a cooled surface maintained at a temperature below the liquefaction point of uranium hexafluoride to effect condensation of the uranium hexafluoride and deposition of solid vanadium oxytrifluoride on the cooled surface, continuously bleeding non-condensable constituents containing the volatile impurities, said non-condensable constituents constituting about 0.5–5% by weight of the crude uranium hexafluoride feed, continuously returning the uranium hexafluoride condensate after contact with the cooled surface to the distilling zone, continuously withdrawing bottoms substantially free of vanadium oxytrifluoride and volatile impurities from the distilling zone, continuously subjecting the bottoms to heat to generate vapors, continuously passing the vapors through a fractionating zone, continuously withdrawing substantially pure uranium hexafluoride from the fractionating zone, and continuously discharging non-volatile impurities from the fractionating zone.

References Cited in the file of this patent

UNITED STATES PATENTS 2,830,873     Katz et al. _____ Apr. 15, 1958

OTHER REFERENCES

Walker et al.: "Principles of Chemical Engineering" (1937), pages 516–518, 543–553, McGraw-Hill Book Co., Inc., N.Y.

Hodgman: "Handbook of Chemistry and Physics" (1953), pages 600–604, Chemical Rubber Publishing Co., Cleveland.

Hyman et al.: "Proceedings of the International Conference on the Peaceful Uses of Atomic Energy," August 8–20, 1955, vol. 9, pages 613–619, United Nations.